(12) United States Patent
Shimizu

(10) Patent No.: US 6,784,874 B1
(45) Date of Patent: Aug. 31, 2004

(54) PUSH-BUTTON SWITCH MEMBER, PORTABLE INFORMATION TERMINAL HAVING PUSH-BUTTON SWITCH MEMBER AND PAYMENT SYSTEM USING PORTABLE INFORMATION TERMINAL

(75) Inventor: Takao Shimizu, Ohmiya (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 373 days.

(21) Appl. No.: 09/661,558

(22) Filed: Sep. 14, 2000

(30) Foreign Application Priority Data

Apr. 10, 2000 (JP) .................................... P2000-107502

(51) Int. Cl.$^7$ ................................................. G09G 5/00
(52) U.S. Cl. .................... 345/173; 345/172; 345/169; 345/2.3
(58) Field of Search ................................. 345/172, 168, 345/169, 170, 173, 1.1, 1.2, 2.1, 2.3; 341/22, 23; 705/39, 41, 44; 235/379, 380, 381, 382, 385; 200/6 A, 5 A

(56) References Cited

U.S. PATENT DOCUMENTS

| | | | | |
|---|---|---|---|---|
| 4,254,453 A | * | 3/1981 | Mouyard et al. | ............ 362/240 |
| 4,551,717 A | * | 11/1985 | Dreher | ........................ 345/170 |
| 4,712,105 A | | 12/1987 | Kohler | |
| 5,034,602 A | * | 7/1991 | Garcia, Jr. et al. | ............. 341/23 |
| 5,113,047 A | * | 5/1992 | Tsutsumi | .................... 200/407 |
| 5,430,262 A | * | 7/1995 | Matsui et al. | ............... 200/5 A |
| 5,867,149 A | | 2/1999 | Jaeger | |
| 5,900,829 A | * | 5/1999 | Gardner et al. | ................ 341/26 |
| 5,979,757 A | * | 11/1999 | Tracy et al. | ................. 235/383 |
| 6,004,049 A | | 12/1999 | Knox | |
| 6,021,399 A | * | 2/2000 | Demers et al. | ............... 705/39 |
| 6,028,591 A | | 2/2000 | Lueders | |
| 6,217,183 B1 | * | 4/2001 | Shipman | ....................... 362/30 |
| 6,243,080 B1 | * | 6/2001 | Molne | ......................... 345/173 |
| 6,369,801 B2 | * | 4/2002 | Boireau et al. | ............. 345/169 |

FOREIGN PATENT DOCUMENTS

| | | |
|---|---|---|
| JP | 9-233567 | 9/1997 |
| WO | 98/34203 | 8/1998 |

OTHER PUBLICATIONS

Du Pré Gauntt, John, "Electronic Commerce on the Move", Proceedings of the 3rd USENIX Workshop on Electronic Commerce, Boston, Massachusetts, Aug. 31–Sep. 3, 1998, XP002201445.

Hafner, Katie, "Want a soda? Phone it in mobile commerce could turn your wireless phone into an electronic wallet for all kinds of purchases.", Sun Sentinel Co., Mar. 12, 2000, XP002932299.

\* cited by examiner

*Primary Examiner*—Xiao Wu
(74) *Attorney, Agent, or Firm*—Wenderoth, Lind & Ponack, L.L.P.

(57) ABSTRACT

A push-button switch member comprises a touch panel having at least one push-button switch, an electronic display disposed in operative association with the push-button switch, and at least one key top portion disposed in operative association with the push-button switch. The key top portion is provided with a functional display of the push-button switch. A portable information terminal is provided with such push-button switch member and a communicator operatively connected to the push-button switch member for communicating with other equipment having a communication function through endless interactive communication. When the portable information terminal approaches the other equipment having the function communicating with the portable information terminal, functional display information stored in the other equipment is inputted into the portable information terminal through the interactive communication.

19 Claims, 12 Drawing Sheets

PRIOR ART

PUSH-BUTTON SWITCH MEMBER, PORTABLE INFORMATION TERMINAL HAVING PUSH-BUTTON SWITCH MEMBER AND PAYMENT SYSTEM USING PORTABLE INFORMATION TERMINAL

BACKGROUND OF THE INVENTION

The present invention relates to a member for a push-button switch having key-top portions for switches through which functions of the push-button switches are displayed by electrical display means, a portable information terminal provided with such push-button switch member and a payment system utilizing such portable information terminal.

In the known art, a push-button switch member or like is utilized for a remote controller for a domestic electrical or electronic equipment such as television set, radio, video system, audio system or like and also utilized, as input means, for electrical or electronic equipment or other equipment in various technical fields such as a control board of machine tool, control panel for automobile or construction machine, portable phone, personal computer and the like.

With the push-button switch member for such input means, the respective key-top portions of the push-button switches of the push-button switch member are designed so that the functions of the key-top portions can be easily recognized by directly printing letters, numerals, symbols, pictures or like representing the respective functions on the key-top portions or by forming cutouts showing letters, numerals, symbols, pictures or like through which lights or like generated inside the switch member pass outside the switch member so as to easily recognize the functions of the push-button switches.

However, in recent years, for the various electrical and electronic equipment and other devices or like provided with the push-button switches, the numbers of the push-buttons has been increased for requirements of increasing functions, modes and the like to be inputted and taking countermeasure to complicated functions or like, and therefore, it has been required to make compact the push-buttons themselves.

In order to satisfy such requirements, it is obliged for the push-button switch member to be made small in size or shape of the key-top portions thereof, and for such reasons, it becomes difficult to clearly display the functions of the key-top portions and exactly perform the functions, which are resulted from worse visibility of the displayed functions of the push-button switch member. It is hence difficult to perform good and easy maneuverability thereof. It is particularly difficult for beginners, children and old persons to use or operate such push-button switch member.

Furthermore, in these days, portable alternate voice (communication) means such as PHS, portable telephone or like having a communication function has been remarkably developed, and it has been tried to design such communication means so as to realize or achieve a number of complicated functions with fewer push-buttons in comparison with note-type personal computers or like. However, on the other hand, such design becomes difficult for the beginners to operate the push-button switches.

In order to obviate such a defect, there has been propose a method of improving the input operability of the portable communication means by connecting a separately independent input device such as pocket-size key board to the portable communication means body.

SUMMARY OF THE INVENTION

An object of the present invention is to substantially eliminate defects encountered in the prior art mentioned above and to provide a push-button switch member capable of easily visually observing and confirming many complicated functions of the push-button switches and achieving an improved maneuverability and also to provide a portable information terminal provided with such push-button switch member.

Another object of the present invention is to provide a payment system using such portable information terminal which can be easily operated even by children and old persons.

These and other objects can be achieved according to the present invention by providing, in one aspect, a push-button switch member comprising a touch panel, at least one push-button switch provided for the touch panel, an electronic display means disposed in operative association with the push-button switch, and at least one key top portion disposed in operative association with the push-button switch, wherein the key top portion being provided with function display of the push-button switch.

In this aspect, the function display is illustrated by text or image selected from either one of letter, reference numeral, symbol, picture, graphic design, photograph and like. The text or image is changed by operating at least one of the push-button switches. The electronic display means is embedded in the key top portion, and the electronic display means comprises a liquid crystal display element.

According to this aspect, the functions of the respective push-button switches can be surely observed in spite of the various complicated functions, and an adequate push-button pushing feeling can be obtained.

Further, since the electronic display means is formed integrally with the key top portions, texts or images can be displayed on the key top portions without being hindered, and a good clicking feeling thereof can be obtained.

Furthermore, a number of functions can be realized by relatively small number of the key top portions, so that the push-button switch member is itself made compact in size and degree of freedom in use can be also widened.

In another aspect of the present invention, there is provided a portable information terminal comprising a push-button switch member comprising a touch panel, at least one push-button switch provided for the touch panel, an electronic display means disposed in operative association with the push-button switch, and at least one key top portion disposed in operative association with the push-button switch. The key top portion is provided with a function display of the push-button switch. The portable information terminal further comprises a communication means operatively connected to the push-button switch member for communicating with other equipment having a communication function through endless interactive (two-way) communication. When the portable information terminal approaches the other equipment having the function communicating with the portable information terminal, function display information stored in the other equipment is inputted into the portable information terminal through the interactive communication.

In this aspect, the portable information terminal is a portable communication machine. The other equipment is an electrical or electronic equipment. The electronic display means displays a text or image in accordance with a function display information obtained from information stored in a server of a seller or provider which is connected to the base station.

According to this aspect, when the portable information terminal approaches the electrical or electronic equipment having the function communicating with the portable information terminal, the function information of the equipment is obtainable and usable functions can be displayed on the key top portion of the portable information terminal, and accordingly, any pre-operation of the electric or electronic equipment will be eliminated.

In a further aspect of the present invention, there is provided a portable information terminal comprising a push-button switch member comprising a touch panel, at least one push-button switch provided for the touch panel, an electronic display means disposed in operative association with the push-button switch, and at least one key top portion disposed in operative association with the push-button switch, the key top portion being provided with function display of the push-button switch. The portable information terminal further comprises a communication means operatively connected to the push-button switch member for communicating with other equipment having a communication function through endless interactive communication. In this aspect the electronic display means is displayed with text or image based on a function display information from information stored in the other equipment. When an optional push-button switch is operated, an output function of the other equipment corresponding to the text or image displayed on the optional push-button switch is performed.

In this aspect, the other equipment is a piece of electrical or electronic equipment, and the electrical or electronic equipment is a domestic electrical or electronic piece of equipment having a function communicating with the portable information terminal through the endless interactive communication.

The electrical or electronic equipment is a home automation equipment having a function communicating with the portable information terminal through the endless interactive communication.

The electrical or electronic equipment is an automatic vending machine including a tobacco automatic vending machine, a drink automatic vending machine and a ticket automatic vending machine having a function communicating with the portable information terminal through the endless interactive communication.

The portable information terminal may further comprise a memory means storing personal information including birth date, identification number and address of a user or customer and a transmission means for transmitting the personal information stored in the memory means to the automatic vending machine.

A bar-code printing or concealed data printing, concerning personal information including birth date, identification number and address of a user, which is not readable as it is by a person but readable by ultraviolet ray is provided at an optional portion of the portable information terminal, and the automatic vending machine is provided with a reader reading the personal information printed on the concealed data.

The electrical or electronic equipment is an award (reception)/payment processing terminal provided at or in a store having a function communicating with the portable information terminal through the endless interactive communication.

The electronic display means displays a text or image in accordance with a function display information obtained from informations stored in a server of a seller or provider which is connected to the base station.

According to this aspect, the functions of the respective push-button switches of this portable information terminal can be surely observed in spite of the various complicated functions, and an adequate push-button pushing feeling can be obtained. Moreover, a plurality of electrical or electronic equipment having different functions can be operated by one portable information terminal, and the operation thereof can be performed by a plurality of push-button switches arranged in rows. Accordingly, even if the equipment has complicated functions, the equipment can be relatively easily handled, thus being usable for a person who first uses such portable information terminal as a function control means.

Furthermore, since the function of the key top portion which is now pushed by the user can be directly recognized through the display on the key top portion, there is substantially no fear of erroneously operating an equipment which has been conventionally treated through an indexing and dialing operations, for example, in prior art, and accordingly, such portable information terminal is easily usable even for a child or an aged person particularly as a effective communication machine or equipment.

The portable information terminal of the present invention can be usable as a remote controller for operating domestic electrical or electronic equipment, home automation equipment or automatic vending machines.

Still furthermore, by storing the personal information such as birth date, identification number, address or like of a user or customer and transmitting such information to the electrical or electronic equipment, selling of products or providing of product information in accordance with the personal specific information of the user can be made by the electrical or electronic equipment, thus being effectively usable. This effect will become further effective by providing a read-out device for the automatic vending machine for reading the concealed data of the personal information.

The portable information terminal will be further usable as a remote controller for the product order service.

Still furthermore, according to this portable information terminal, the customer can obtain the most recent information concerning the product or service to be provided at an existing position. Furthermore, the input information can be instantaneously inputted into the server of the seller or provider, so that the seller or provider can obtain the most recent informations of the selling or providing conditions, thus being available for management.

In a still further aspect of the present invention, there is provided a payment system comprising a portable information terminal provided with a push-button switch member comprising a touch panel, at least one push-button switch provided for the touch panel, an electronic display means disposed in operative association with the push-button switch, and at least one key top portion disposed in operative association with the push-button switch. The key top portion is provided with a function display of the push-button switch. Further, a communication means is operatively connected to the push-button switch member for communicating with other equipment having a communication means through endless interactive communication. When the portable information terminal approaches the other equipment having the function communicating with the portable information terminal, function display information stored in the other equipment is inputted into the portable information terminal through the interactive communication. The payment system further comprises a first server of a seller or provider into which an order information inputted by operating at least one push-button switch of the portable information terminal is inputted through an award/payment processing terminal provided for an automatic vending machine, or a seller or provider. The first server operates to convert the order information into a payment information of a costumer. The payment system still further comprises a second server of a predetermined finance (financial) company into which the payment information is inputted. Money in accordance with the payment information is paid from an account of a transacting bank of a customer to an account of a transacting bank of the seller or provider.

There is also provided a price payment system comprising a portable information terminal, a first server and a second server.

The portable information terminal is provided with a push-button switch member comprising a touch panel, at least one push-button switch provided for the touch panel, an electronic display means disposed in operative association with the push-button switch, and at least one key top portion disposed in operative association with the push-button switch. The key top portion is provided with a function display of the push-button switch, and a communication means operatively connected to the push-button switch member for communicating with other equipment having a communication means through endless interactive communication. The electronic display means is displayed with text or image based on function display information from information stored in the other equipment. When an optional push-button switch is operated, an output function of the other equipment corresponding to the text or image displayed on the optional push-button switch serves.

The first server is of a seller or provider into which an order information inputted by operating at least one push-button switch of the portable information terminal is inputted through an award/payment processing terminal provided for an automatic vending machine, or a seller or provider. The first server operates to convert the order information into a payment information of a customer.

The second server is of a predetermined financial company into which the payment information is inputted.

Money in accordance with the payment information is paid from an account of a transacting bank of a customer to an account of a transacting bank of the seller or provider.

In the above aspect, the payment information includes a seller/provider information, a product/service information, a selling number information, a price information and a personal specific information, and the seller/provider information, the price information and the personal specific information are inputted into the second server.

According to this aspect, by using the portable information terminal of the characters mentioned above, the cashless payment for the price for the product or service can be easily established and realized. Furthermore, the recovery of the money can be eliminated and there can be reduced a case of no recovery of the money or price, thus being effective and soundness for the management.

The nature and further characteristic features of the present invention will be made more clear from the following descriptions made with reference to the accompanying drawings.

DESCRIPTION OF THE PREFERRED EMBODIMENTS

The present invention will be described hereunder with reference to FIGS. 1 to 14.

First Example 1 of Push-Button Switch Member

A first example of a member for the push-button switch, called hereinlater as push-button switch member, of the first embodiment of the present invention will be first described.

Figure 1:
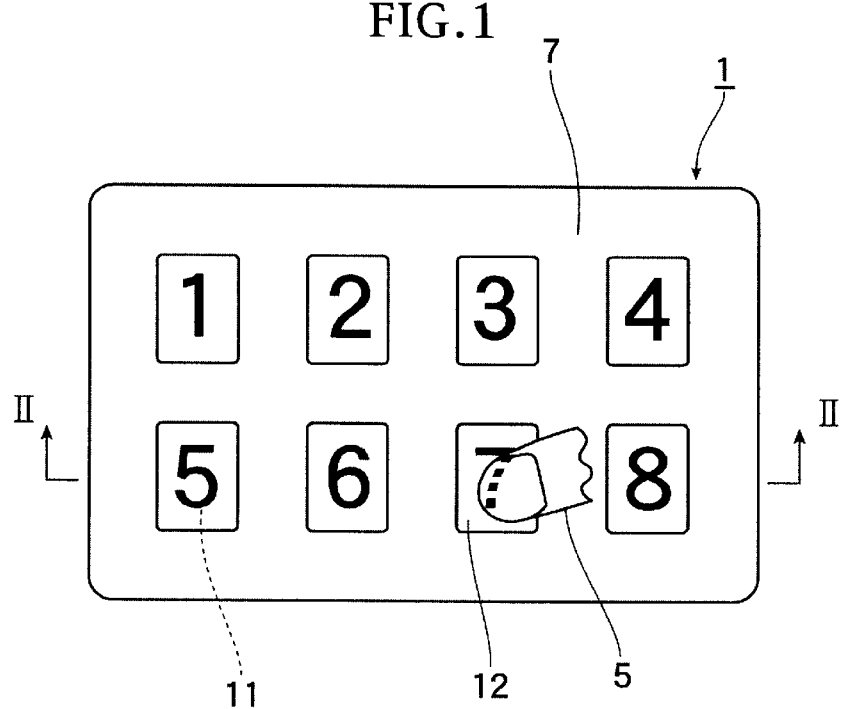
FIG. 1 is a plane view of a member for a push-button switch according to one example of a first embodiment of the present invention.
Figure 2:
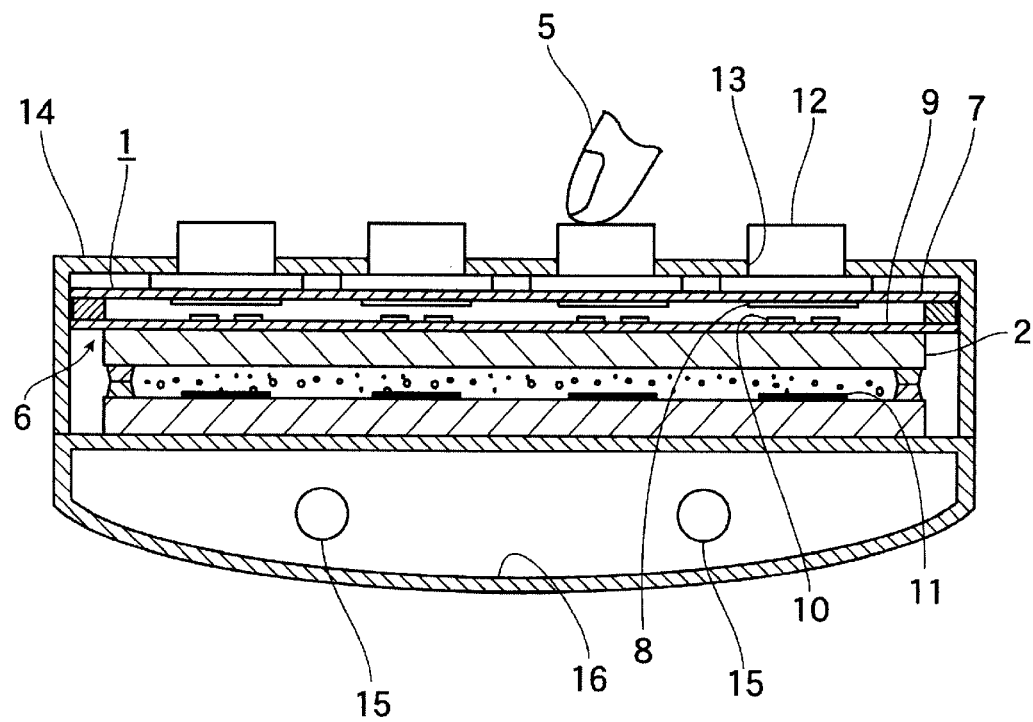
FIG. 2 is a sectional view taken along the line II—II in FIG. 1.

With reference to FIGS. 1 and 2, reference numeral 1 denotes a liquid crystal touch panel comprising a liquid crystal display element 2 and a touch panel switch 6 mounted to the liquid crystal display element 2.

On the front display side surface (upper side surface as viewed) of the liquid crystal element 2, is provided an upper transparent resin base member (substrate) 7, which has an inner surface on which a movable contact 8 is disposed. A lower transparent resin base member 9 is also disposed so as to oppose to the upper transparent resin base member 7, and the lower transparent resin base member 9 has an inner surface on which a stationary contact 10 is disposed, so that when the movable contact 8 contacts the stationary contact 10, a circuit arranged on the stationary contact side is closed, thus forming a touch panel 6 assembled in the liquid crystal panel 1.

In an actual structure, a plurality of movable contacts 8 are arranged to the upper transparent resin base member 7 at portions corresponding to respective display portions 11 of the liquid crystal display element 2, and key-top portions 12 are disposed on the upper side surface of the upper transparent resin base member 7 at portions corresponding to the movable contacts 8, respectively, the key-top portions 12 acting as push-operation elements when depressed.

That is, when viewed from directly upper side portion of the liquid crystal touch panel 1, i.e. from a direction of FIG.

1 perpendicular to the drawing paper surface, the movable contacts 8, the display portions 11 and the key-top portions 12 have aligned or overlapped positional relationship.

The key-top portions 12 are integrally fixed to the upper surface of the upper transparent resin base member 7, and as occasion demands, is applied a cover 14 thereto, which has holes 13 each having a size slightly larger than an outer size of each of the key-top portions 12 to thereby protect the outer portion of the key-top portions 12. That is, when the cover 14 is applied, only projected portions of the key-top portions 12 are exposed outside the cover 14 through the holes 13.

Further, to the lower surface of the liquid crystal element 2, are disposed light source(s) 15 and reflecting (reflector) plate 16.

The liquid crystal element 2 has a display function in accordance with the preliminarily set positions of the respective movable contacts 8, and necessary functions are optionally allotted, the allotted functions being displayed through image or text such as letters, symbols, pictures, graphic designs or photographs. According to such structure, different texts or images of the numbers of the movable contacts 8 disposed at portions corresponding to the positions 11 of the liquid crystal element 2 can be displayed, and the displayed texts or images can be displayed to the respective key-top portions 12.

Since it is of course a matter of free choice how functions are to be allotted to the respective movable contacts 8, the same functions may be allotted to different movable contacts 8 as occasion demands, and in such case, the same texts or images are displayed on the key-top portions of the movable contacts 8 having the same functions.

Further, a plurality of functions are applied to the circuit of the stationary contacts 10 corresponding to the respective key-top portions 12 in accordance with ways how signals are applied. In such a case, it becomes possible to change the display of the function to the key-top portions 12 by displaying the texts or images corresponding to those functions to the display portions 11 corresponding to the stationary contacts 10.

According to such structure, it becomes possible to realize a plurality of functions with a reduced number of key-top portions 12, so that the size of the push-button switch cover member can be made itself compact. Therefore, the electrical or electronic equipment provided with such cover member can also be compact and the flexibility of design can be enhanced. This provides an electric or electronic equipment suitable for requirements of users.

An actual operation of the push-button switch member of the structure mentioned above will be described hereunder through an example.

For example, with reference to FIG. 1, when a key-top portion 12 on which a letter (numeral) "7" is displayed is depressed by a finger 5, the upper transparent resin base member 7 of the touch panel switch 6 is depressed to thereby contact the movable contact 8 disposed to the inner surface of the base member 7 to the stationary contact 10 disposed to the inner surface of the lower transparent resin base member 9. According to this operation, the circuit opened by the stationary contact 10 is closed and the function corresponding to that circuit is achieved.

In this example 1, although the liquid crystal element as an electronic equipment is adopted, the push-button switch member of this embodiment will be applicable to a plasma display panel, EL (electronic luminescence) lamp panel or like. Moreover, when this push-button switch member is applied to an electric or electronic equipment requiring no portability (portable function), the switch member may be applied to a CRT display means.

Second Example of Push-Button Switch Member

A second example of the push-button switch member will be described hereunder with reference to FIG. 3.

A plurality of circuits performing predetermined functions are formed on a circuit board 17, and stationary contacts 10 in opened state are provided for these circuits, respectively.

A click plate 19 is mounted so as to cover the printed circuit board 17 through a spacer 20, and a plurality of conical (corned disc) spring portions 18 each having an inverted bowl shape are formed to this click plate 19 so as to oppose to the stationary contacts 10, respectively. A movable contact 8 capable of being contacted to the stationary contact 10 is mounted to the lower surface portion of the top portion of the conical spring portion 18.

Above the click plate 19, there is disposed a cover member 24 so as to cover the click plate 19. This cover member 24 is formed with key top portions 12, each having a downward projection 21, which pushes the top portion of the conical spring portion 18 by depressing the key top portion 12 by a finger, for example, and the key top portions 12 are continuous to support portions through thin portions 22.

A liquid crystal display element 2 is mounted to the lower surface of the printed circuit board 17. The printed circuit board 17, the stationary contacts 10, the movable contacts 8 and the key top portions 12 are formed of transparent materials so that the text or image displayed on the liquid crystal element 2 can be observed from the upper portion of the key top portion 12.

The other structures of this second example are substantially the same as those of the first example mentioned hereinbefore, and accordingly, like reference numerals are added to the portions or elements corresponding to those of the first example and the explanation thereof is omitted herein.

Figure 3:
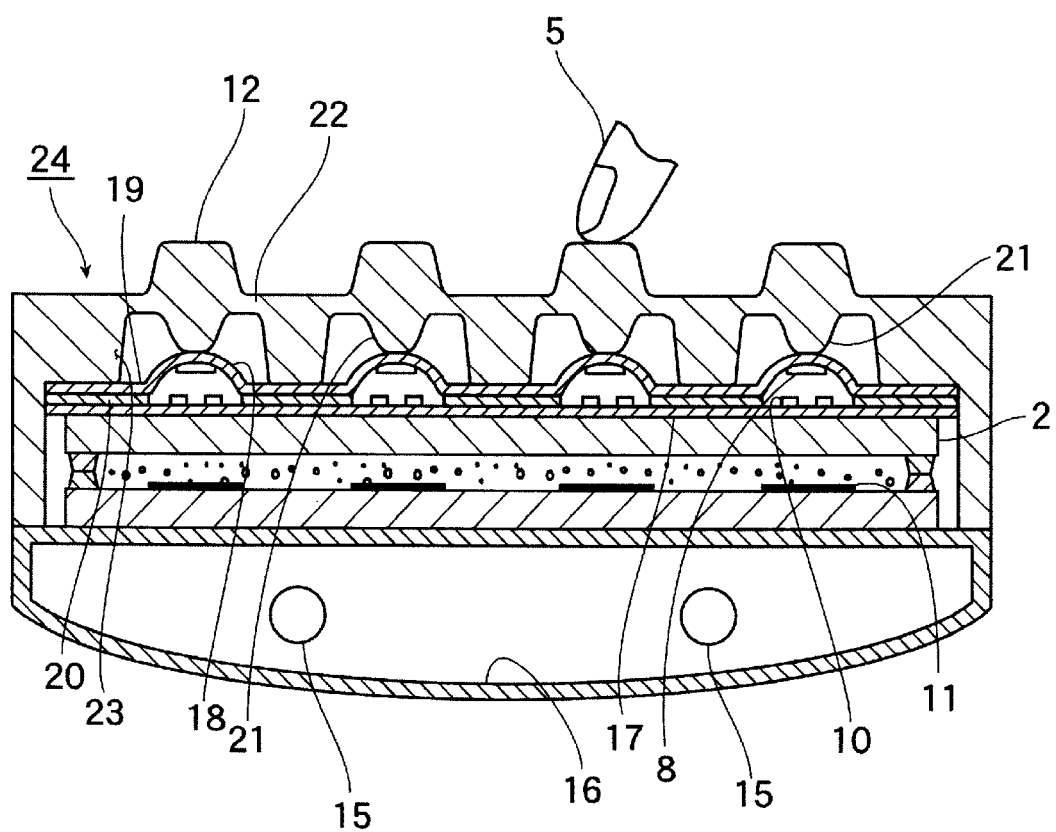
FIG. 3 is a view similar to FIG. 2, which represents a push-button switch member according to another example of the first embodiment of the present invention.

Then, with reference to FIG. 3, when the push-button switch member of this second example is utilized, one of the key top portions 12 on which a desired function is displayed is pushed (depressed) by a finger 5, the projection 21 formed to the bottom surface of that key top portion 12 depresses the top portion of the conical spring portion 18 of the click plate 19 disposed thereunder to thereby contact the movable contact 8 formed to the lower surface of the top portion of the conical spring portion 18 to the corresponding stationary contact 10 formed to the printed circuit board 17. The top portion of the conical spring portion 18 is elastically deformed in a reverse shape just before the contacting of the movable contact 8 to the stationary tact 10.

Through this contacting of the movable contact 8 to the stationary contact 10, which has been released, the circuit is closed to thereby perform a predetermined function of this circuit, and simultaneously, a clicking feeling can be obtained due to the elastic deformation of the conical spring portion 18 at the time of depressing the key top portion 12.

A third example of the push-button switch member will be described hereunder with reference to FIG. 4.

Figure 4:
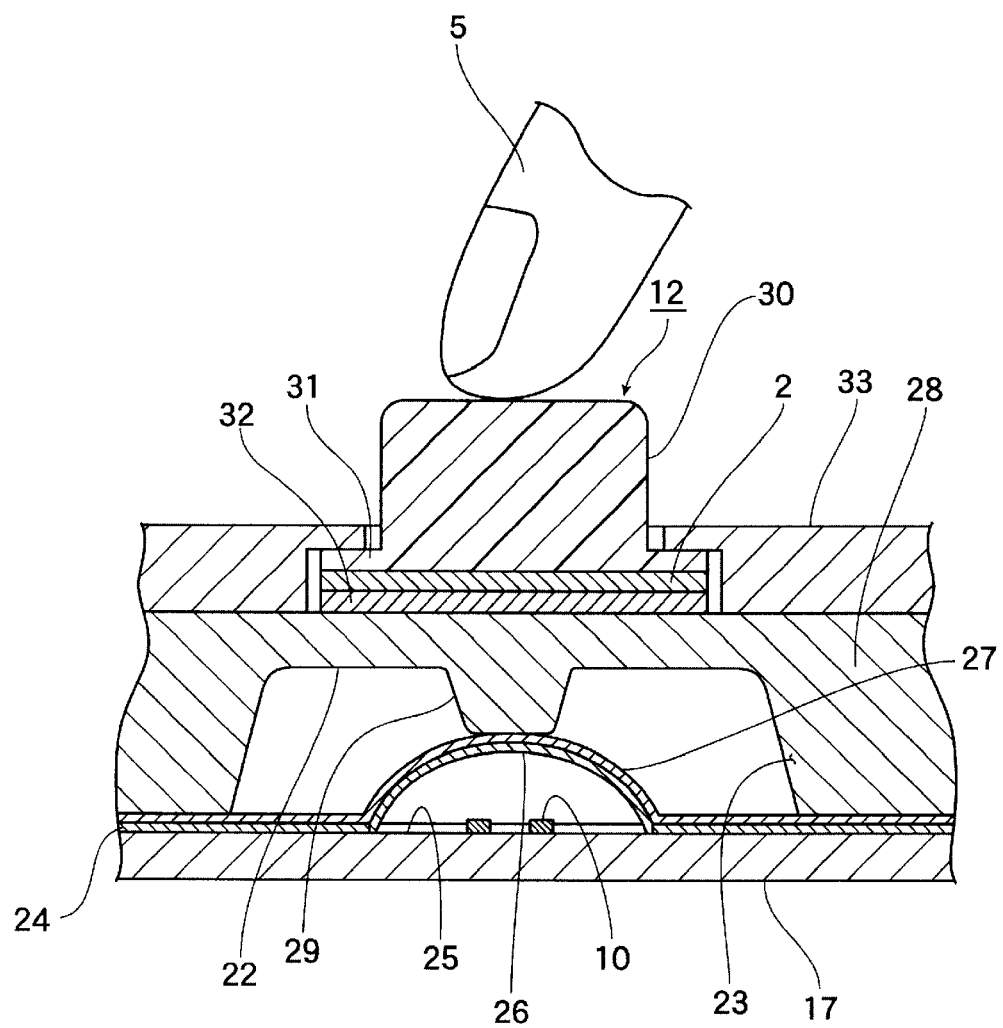
FIG. 4 is a view similar to FIG. 3, but in an enlarged scale, which represents a push-button switch member according to a further example of the first embodiment of the present invention.

FIG. 4 is a sectional view of the essential portion of the push-button switch member according to this third example.

On the printed circuit board 17, there are formed a plurality of circuits for attaining predetermined functions as like as in the second example mentioned above, and a plurality of stationary contacts 10 now released (opened) are preliminarily formed.

A conductive metallic conical spring portion 26 having an inverted bowl shape is disposed to a hole portion 25 of a PET (polyethylene terephthalate) sheet 24, provided with adhesive, so as to oppose to the stationary contact 10, and a conical spring fixing sheet 27 is also disposed so as to cover the conical spring portion 26 and the PET sheet 24.

A cover substrate 28 is disposed so as to cover the conical spring fixing sheet 27, the cover substrate 28 being formed with a pressing projection 29 abutting against the upper surface of the conical spring fixing sheet 27 at the top portion of the metallic conical spring portion 26. A support portion 23 is formed to the outer peripheral portion of the pressing projection 29 through a thin thickness portion 22.

A key top portion 12 is arranged to the upper surface of the cover substrate 28 on a side opposite to the pressing projection 29. The key top portion 12 is composed of a key top body 30 which is directly subjected to the pressing operation and a flanged portion 31 extending from the lower side surface portion of the key top body 30. The key top portion 12 is entirely formed of a transparent resin material.

A small-sized liquid crystal display element (electronic display element) 2 is disposed to the lower portion of the flanged portion 31 of the key top portion 12, the liquid crystal display element 2 having substantially the same size as that of the flanged portion in a plane view.

Further, it is of course to be noted that a number of or plurality of structures including the key top portions 12 and others mentioned above with reference to FIG. 4 are arranged for the push-button switch member of this third example as like as the second example shown in FIG. 3.

The key top portion 12, the liquid crystal display element 2 and the back-light 32 are formed as an integral part and the lower surface of the back-light 32 is bonded to the upper surface of the cover substrate 28. The upper portion of the key top portion 12 and the peripheral portion of the flanged portion 31 thereof are covered by a cover member 33.

Further, it is of course to be noted that a number of or plurality of structures including the key top portions 12 and others mentioned above with reference to FIG. 4 are arranged for the push-button switch member of this third example 3 as like as the example 2 shown in FIG. 3.

In this third example, when the key top portion 12 is depressed, the key top portion 12 is depressed inward of the key top cover 33. However, since the liquid crystal display element 2 is covered by the key top cover 33, an external force or impact does not directly applied to the liquid crystal display element 2, thus preventing it from being damaged.

It is preferred that at least upper and lower surfaces of the key top portion 12 are made transparent so that a text or image displayed on the liquid crystal display element 2 can be observed from the upper surface side of the key top portion 12.

Now, in the present invention, it is not necessarily limited for the text or image on the liquid crystal display element 2 to be observed from the upper surface side of the key top portion. That is, as far as a function of the push-button switch could be displayed to the key top portion 12 providing a press-operation portion, there can be provided a structure in which the text or image can be observed from a side surface side of the key top portion 12 by obliquely arranging the liquid crystal display element 2, and thus, the design of this structure may be optionally changed.

In the push-button switch member according to the third example represented by the structure of FIG. 4, although the liquid crystal display element 2 is mounted to the lower surface portion of the key top portion 12, the liquid crystal display element 2, having a size or dimension substantially equal to or slightly smaller than the cross sectional surface of the key top body 30, may be embedded into the key top body 30.

In such arrangement, since there is no portion, except a terminal, not shown, to be connected to the liquid crystal display element 2, exposed externally of the key top portion 12, a possibility for causing any damage to the liquid crystal display element 2 can be further reduced.

The third example of the structure mentioned above will operate and function in the following manner.

As mentioned before, a plurality of structures including the key top portions 12 and others mentioned above with reference to FIG. 4 are arranged for the push-button switch member.

To the liquid crystal display elements 2 disposed to the lower surface portions of the respective key top portions 12 arranged so as to correspond to the respective stationary contacts 10 of the printed circuit board 17, texts or images corresponding to the preliminarily set functions of the circuits of the stationary contacts 10 are displayed, so that such texts or images displaying the functions can be observed from the upper surface sides of the key top portions 12.

When a certain key top portion 12 on which a desired function is displayed is depressed by a finger 5, for example, the pressing projection 29 formed to the bottom surface of the key top portion 12 depresses the top portion of the conductive metallic conical spring portion 26 through the conical spring fixing sheet 27 disposed below the pressing projection 29.

Then, because the outer peripheral portion of the metallic conical spring portion 26 is contacted to and is restricted by the inner peripheral portion of the hole 25 of the PET sheet 24, the metallic conical spring portion 26 is deformed so that only the top portion thereof is lowered, and finally, the inner surface of the top portion of the metallic conical spring portion 26 is contacted to the stationary contact 10. In this operation, just before the contacting of the top portion to the stationary contact 10, the metallic conical spring portion 26 is elastically deformed in a reverse shape, thus giving a clicking feeling to the finger 5 contacting the key top portion 12.

According to such operation as mentioned above, through the contacting of the conductive metallic conical spring portion 26 to the opened stationary contact 10, the circuit of this stationary contact 10 is closed and the function corresponding to this circuit can be attained, as well as an operation feeling of the depressing operation of the key top portion 12 is obtainable.

In the push-button switch member of the third example of the present invention, the liquid crystal display element 2 is formed integrally with the key top portion 12, there is no portion or element to hinder the display of the text or image displayed on the key top portion 12 and a metallic member having high elasticity is adopted as conical spring portion disposed to the lower portion of the liquid crystal display element 2, so that high clicking feeling can be achieved, thus obtaining high operating feeling.

Second Embodiment of The Invention

A second embodiment of the present invention relating to a potable information terminal provided with a push-button switch member will be described hereunder.

First Example of Portable Information Terminal

Figure 5:
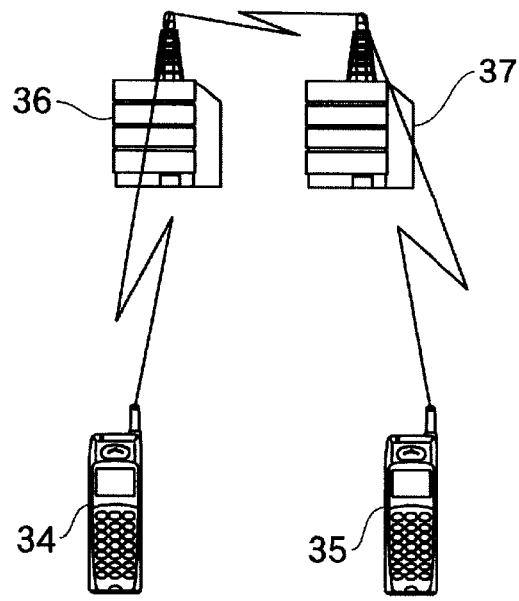
FIG. 5 illustrates a use of a portable information terminal, provided with the push-button switch member of the first embodiment, according to one example of a second embodiment of the present invention.

FIG. 5 is an illustration explaining a state of using a portable information terminal provided with the push-button switch member according to the first embodiment mentioned hereinbefore. The example of FIG. 5 is provided with a portable information terminal 34 provided with the push-button switch member of the first through third examples of the first embodiment and also provided with means or function enabling wireless interactive (two-way) communication with another portable information terminal 35 such as PHS or portable telephone having a communication function.

More specifically, in a case where the portable information terminal 34 provided with the push-button switch member is a portable telephone or PHS and another one portable telephone or PHS is used as the other terminal 3 5 and both terminals are under usable conditions, both the portable information terminals 34 and 35 can be communicated through nearest base stations 36 and 37, respectively.

Figure 6:
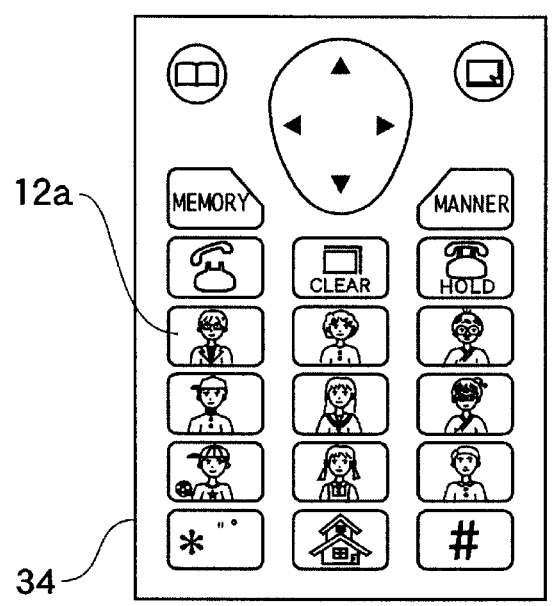
FIG. 6 illustrates a function display design of key-top portions of the portable information terminal shown in FIG. 5, for example.

FIG. 6 is an illustration of one example of a function display design of a key top portion of the portable telephone or PHS of the portable information terminal 34 provided with the push-button switch member.

In the illustrated example, texts or images displayed on the liquid crystal display element may not be ready-made ones and may be ones prepared by a user by using such as electronic camera or image scanner. For example, in a case of a structure that photograph of a father is displayed on one key top portion 12a to which dialing function to a portable telephone of the father is given, the portable information terminal 34 is connected to the father's portable telephone only by depressing this key top portion 12a.

Accordingly, in the portable information terminal provided with the push-button switch member of this example of the present invention, since the function of the key top portion 12 which has been just to be operated by a user can be directly observed and recognized from the display on the key top portion 12, an occurrence of erroneous operation in indexing a name of an object and then dialing or pushing a number plate of a telephone as in a conventional manner can be reduced or eliminated. Moreover, it is possible to call an object (a person at the other end of the line) only by pushing the key top portion 12 on which the photograph of the object is displayed, and accordingly, a communication through the line can be easily, surely and speedily realized, thus being advantageous particularly at an emergency calling time.

Second Example of Portable Information Terminal

Figure 7:
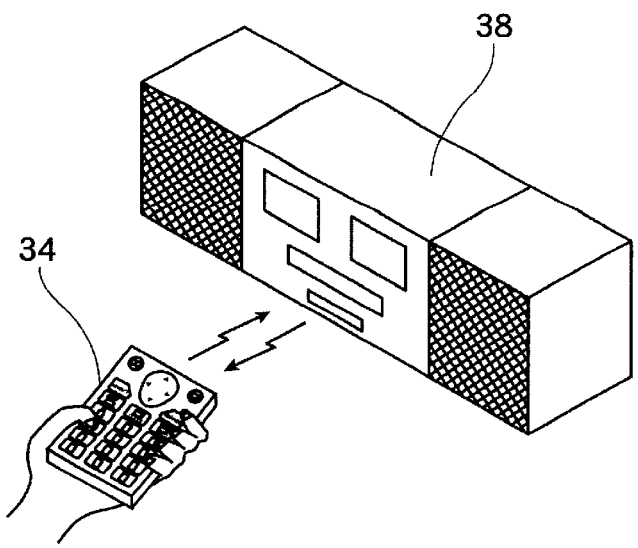
FIG. 7 illustrates a use of a domestic-type portable information terminal, provided with the push-button switch member of the first embodiment, according to another example of the second embodiment of the present invention.

FIG. 7 illustrates usage of a second example of a portable information terminal provided with the push-button switch member according to the first embodiment mentioned hereinbefore.

The example of FIG. 7 is provided with a portable information terminal 34 provided with the push-button switch member of the first through third examples of the first embodiment and also provided with means or function enabling wireless interactive communication with another piece of equipment 38 such as a piece of domestic electrical or electronic equipment, for example, an audio system.

Further, the liquid crystal display element 2 is made to be capable of displaying texts or images based on function display information obtained from information stored in the piece of domestic electrical or electronic equipment 38.

Although a technology for realizing a wireless interactive communication between not-so-separated two positions, for example, between the piece of domestic equipment 38 and the portable information terminal 34 may be based on a communication utilizing infrared ray, it is desired to adopt Bluetooth™ as a standard for carrying out the interactive communication by connecting various electrical or electronic equipment such as portable computers utilizing a frequency band of 2.4 GHz (ISM: Industry Science Medical).

At present, in the Bluetooth™ the endless communication of 1 Mbps can be carried out within a range of 10 m by installing a small sized transceiver module having an area of 0.5 inch$^2$ to the terminal. The Bluetooth™ can provide a merit such that the communication can be established even if a certain object is present at a portion between the interactive communication, such merit being not attained by the conventional communication technology utilizing the infrared ray.

For this reason, the information can be transmitted and received without directing a transmitting element (portion) of the portable information terminal to a receiving element (portion) of the electrical or electronic equipment as in the conventional communication using the infrared ray, and thus, the portable information terminal can be used without paying attention to an attitude or direction thereof, thus particularly being advantageous in the outdoor use.

Figure 8:
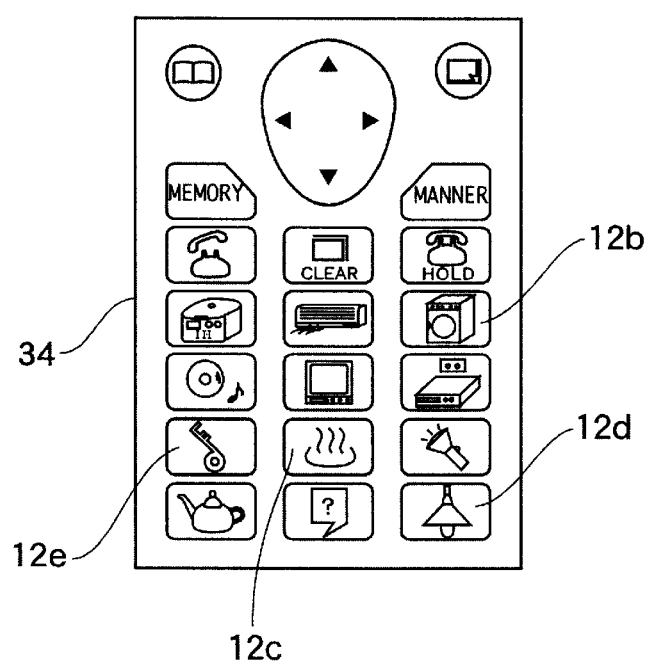
FIG. 8 illustrates a function display design of key-top portions of the domestic-type portable information terminal shown in FIG. 7.

FIG. 8 is an illustration similar to that of FIG. 6 and showing one example of a function display design of a key top portion of a domestic portable information terminal provided with the push-button switch member of the type mentioned hereinbefore.

In this example, the portable information terminal 34 provided with the push-button switch member is usable as a remote controller for controlling or operating functions of domestic electric or electronic equipment 38.

In an actual use, a key top portion 12 showing a desired function is operated at a portion near the electric or electrical equipment 38 to be operated so as to obtain a function display information stored therein. Then, upon receiving the function display information, the electronic display element 2 acts, and for example, by pushing the key top portion 12 on which a display 12b of a stereo component as one piece of the domestic electrical or electronic equipment 38, the portable information terminal 34 acts as a remote controller for the stereo component.

At this time, the displays of the respective key top portions 12 are switched and informations for operating functions concerning the stereo component are displayed on the key top portions 12. Then, for example, by operating a key top portion displaying a sound volume control function, not shown, a sound volume of the stereo component can be adjusted to a desired volume.

As mentioned above, according to the domestic portable information terminal provided with the push-button switch member of the described example shown in FIG. 8, all equipment usable in house including the electrical or electronic equipment and the functions thereof can be displayed on the key top portions 12 through the electronic display element 2. Therefore, the portable information terminal are further conventionally usable by inputting all the information of such equipment.

That is, for example, on the key top portions, are displayed a display 12c of a bath control equipment for controlling water boiling state, boiled water temperature and the like, a display 12d of a light control equipment for controlling the lighting-on or -off or lighting strength of indoor lights, a display 12e of a crime prevention equipment such as door-key locking or unlocking, or other displays. Accordingly, the portable information terminal 34 provided with the push-button switch member is usable as a remote controller for controlling domestic equipment concerning home automation.

Third Example of Portable Information Terminal

FIGS. 9 to 13 are illustrations of another (third) example of a portable information terminal according to the present invention which is usable at a portion of a commercial transaction.

The portable information terminal 34 provided with the push-button switch member of this example is provided with communication function to be connectable to base stations 36, capable of performing the endless interactive communication, to automatic vending machines 39 or award (reception)/payment processing (treatment) terminals 40 disposed to portions capable of providing commercial products or services.

Furthermore, it is possible for the portable information terminal 34 to be provided with an IC chip (IC circuit)

storing personal identification (associate) informations stored in a credit card or like and other payment information.

On the other hand, the automatic vending machine 39 or the award/payment processing terminal 40 disposed to the portion capable of providing commercial products or services is provided with communication function capable of carrying out the endless interactive communication to the base station 37 or portable information terminal 34 provided with the push-button switch member.

Furthermore, the automatic vending machine 39 or the award/payment processing terminal 40 disposed to the portion capable of providing commercial products or services is equipped with an IC chip (IC circuit) capable of storing information of commercial product or services (concerning available stock of products, service waiting stage and the like), information concerning proof of purchase or producing the products such as providing product price. Such information can be sent or received as occasion demands to or from a server 41a of a seller or provider 44 connected to the base station 36 (37).

The electronic display element (device) 2 has a function capable of displaying texts or images based on the function display informations obtained from the informations stored in the server 41a of the provider 44 directly connected to the base station 36 or 37, the informations for selling the products from the automatic vending machine 39, or the informations stored in the award/payment processing terminal 40 disposed at the portion from which the products and services can be provided.

Figure 9:
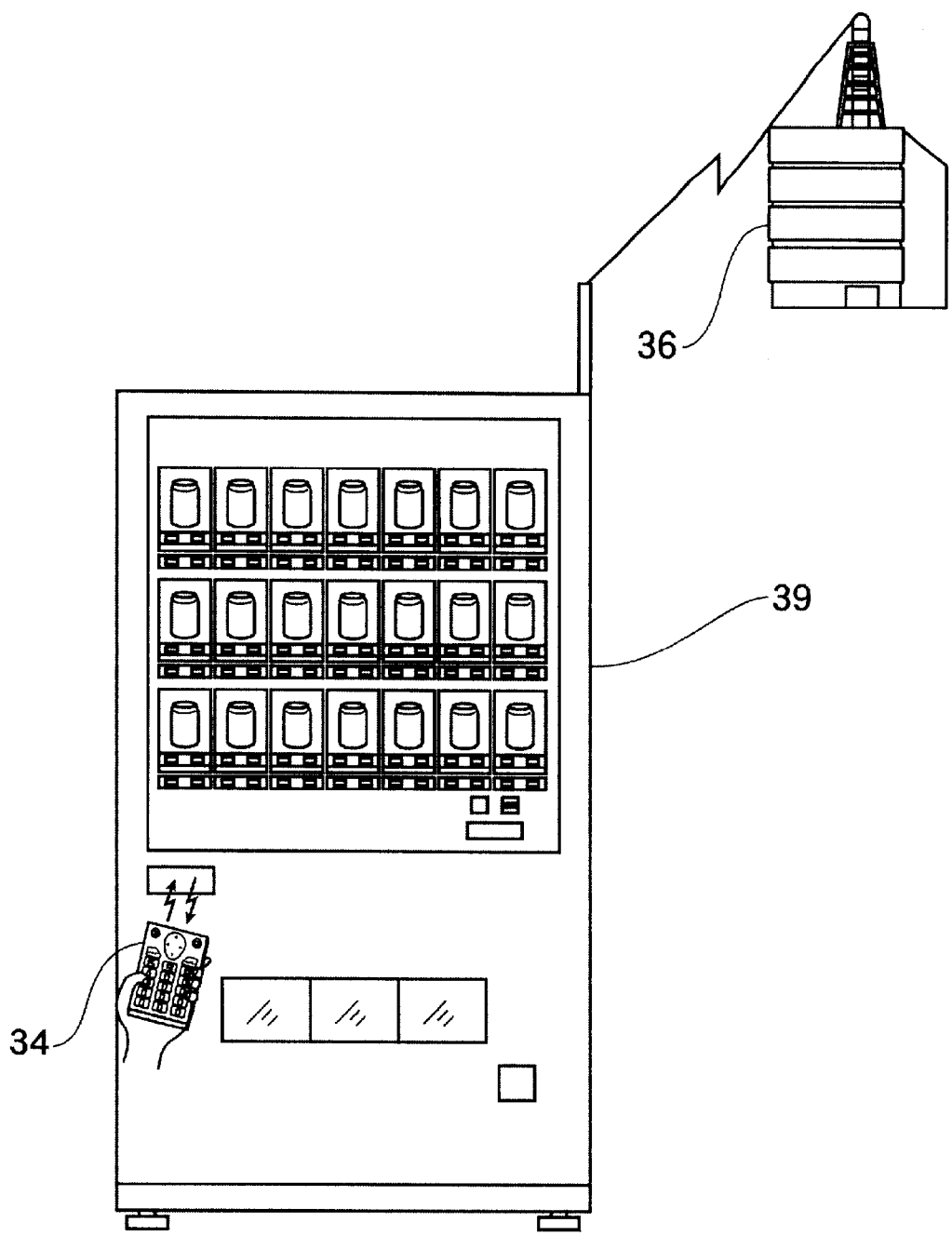
FIG. 9 is illustrates a use of a portable information terminal, provided with the push-button switch member of the first embodiment, according to a further example of the second embodiment of the present invention.

FIG. 9 illustrates a use of the portable information terminal provided with the push-button switch member for the automatic vending machine according to this third example of the embodiment of the present invention.

Figure 10:
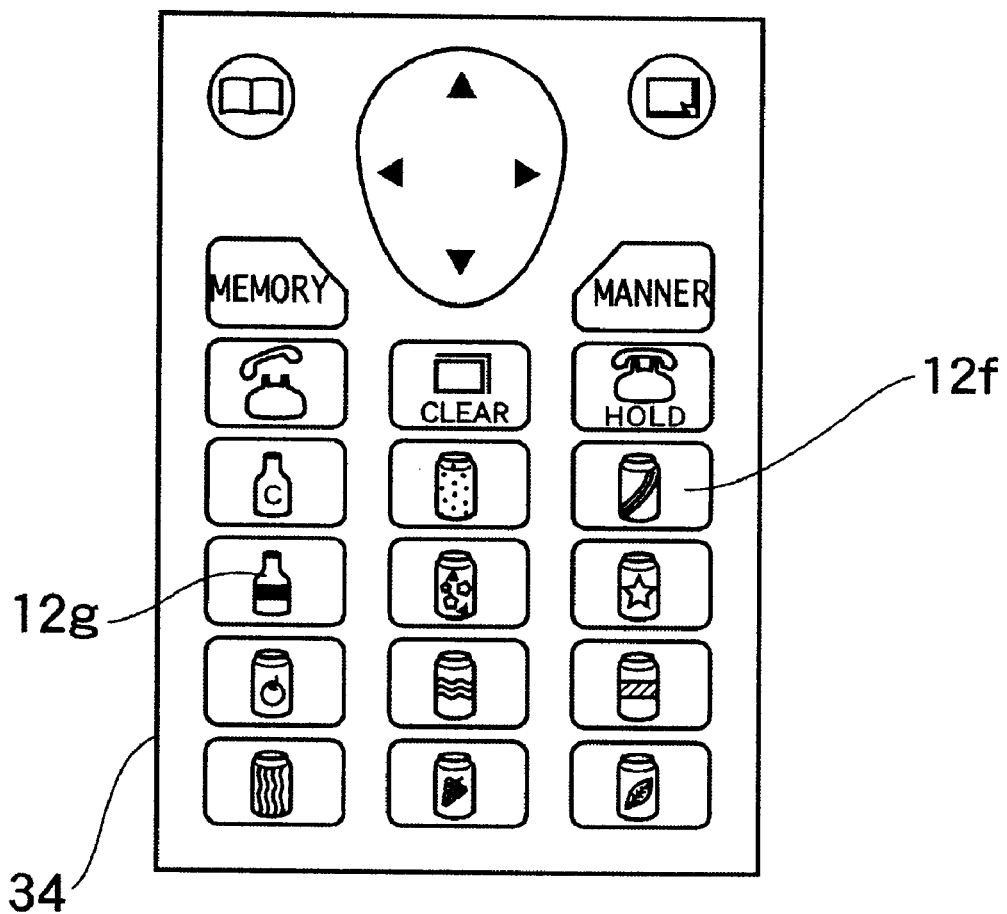
FIG. 10 illustrates an exemplary function display design of key-top portions of the portable information terminal shown in FIG. 9.

FIG. 10 is also an illustration showing the portable information terminal 34 which is applicable to a case where the electrical or electronic equipment is an automatic vending machine for liquid drink. However, automatic vending machines for tobacco, tickets or others may be substituted for such automatic vending machines.

The liquid crystal display element 2 is constructed such that texts or images based on the function display informations obtained from the informations stored in the liquid drink automatic vending machine 39 can be displayed and the respective functions of the liquid drink automatic vending machine 39 are displayed on the respective key top portions 12 of the portable information terminal 34 provided with the push-button switch member.

When using, a user approaches a liquid drink automatic vending machine 39 accommodating a desired drink and then operates the key top portion 12 of the portable information terminal 34 to thereby obtain the function display information stored in the liquid drink automatic vending machine 39.

In response to the thus obtained function display information, the electronic display element 2 of the portable information terminal 34 provided with the push-button switch member is operated. As shown in FIG. 10, the portable information terminal 34 displays such as information, symbols or like showing canned liquid drinks 12f, bottled liquid drinks 12g, etc. are displayed on the respective key top portions 12.

Then, by operating one key top portion 12 on which the desired liquid drink is displayed as an object to be sold, the desired canned or bottled drink can be obtained.

As mentioned above, in the case of using the portable information terminal 34 provided with the push-button switch member according to this third example of the embodiment of the present invention, since it is not necessary for the automatic vending machine 39 itself to be provided with the information of commercially selling product through this automatic vending machine 39 such as sample of the product or display thereof, it can be possible for a user or customer to obtain products accommodated in this automatic vending machine 39 without apprehension even in a case of products, such as wig, contraceptive appliance, or like, which are difficult to be obtained in the presence of others.

Moreover, even if a third person sees the automatic vending machine 39 accommodating such products as mentioned above, it is not certain what products are sold through the automatic vending machine 39 from an outer appearance thereof. Thus, the user can obtained the desired product stored in the automatic vending machine 39 with no uncomfortable feeling, and moreover, there will be able to provide an environment desired for young men from a viewpoint of the crime prevention.

Still furthermore, in view of circumstances of selling products through the automatic vending machines in recent days, it will be proposed by the inventors to provide personal information such as birth date, address, identification number or like to a portable information terminal 34 provided with the push-button switch member according to this example of the embodiment.

For this purpose, as means for providing the portable information terminal 34 with such personal information, it will be considered to provide a store (memory) means such as IC chip (IC circuit) storing the personal information in the portable information terminal 34 provided with the push-button switch member or provide an inhibited data printing, which is difficult for other persons to read as it is, such as date printing capable of being read by means of bar cord or ultraviolet rays so as not to be easily known or recognized by the other persons.

Then, on the other hand, it is necessary for the automatic vending machine 39 to be provided with a reader (reading means), not shown, capable of reading the personal information inhibitedly printed to the portable information terminal 34 and discriminating or judging alignment between the thus read out personal information and the available information of the products to be sold (information showing conditions capable of being sold) accommodated in the automatic vending machine 39. According to such embodiment, there will be prevented a case of selling products, such as tobacco, liquors, adult magazines or like, which are prohibited by the law to be sold to young persons of an age of less than eighteen or twenty, for example.

Further, according to this example, it may be possible to store the available information for the products in the automatic vending machine 39 mentioned above in the memory means of the automatic vending machine 39 itself or in a memory means of a server 41a of a provider (seller) capable of being communicated with the automatic vending machine 39. According to such example of the embodiment of the present invention, it is not necessary to locate a person such as observer confirming whether a user satisfies the available conditions to set a time period to be sold at which the observer exists near the automatic vending machine 39. Accordingly, it will become not necessary to limit setting or usable portions of the automatic vending machines 39 or limit the usable time thereof which have been made for limiting persons obtaining products through the automatic vending machines. Thus, a person who satisfying fundamental conditions to obtain products can obtain the desired product at any portions and any time, thus being comfortable and convenient.

Furthermore, in a modified example, it may be possible to store, to the portable information terminal 34 provided with the push-button switch member, personal informations such as an information belonging to a specified party as a member such as talent fan club, political party or like. According to such example, it is possible to selectively sell or provide products sold only to the members of the specified party or party's publication distributed thereto.

Still furthermore, it may be possible to store, to the portable information terminal provided with the push-button switch member, information concerning physical characteristics of a user such as the age of a person, whether the person is intellectually handicapped, whether the person is a diseased adult or like, as personal information. According to such example, services in accordance with the personal characteristic can be realized.

For example, it may be possible to sell necessities of life for the aged persons at a price cheaper than a general price, to make remarkable a display of product for a visually impaired person, to provide product information with voice or sound, to sell a low calorie liquid drink to a diabetic, to provide, to a foreigner, translated material according to his (her) nationality, or to provide other services, thus being properly applicable in accordance with variety of needs.

Still furthermore, in an example applied for the payment system, it may be desired for the portable information terminal 34 with the push-button switch member to be provided with a function capable of being communicated with a debit card for directly draw out money from a bank account of a customer at a time of receiving the various services mentioned above through the portable information terminal 34. Alternatively, it may be further desired for the portable information terminal 34 itself to be provided with the same function as the debit card.

Furthermore, it is considered that the payment system may be incorporated in a payment system of a communication fee between the terminal and the base station. In such example, since the portable information terminal 34 can be utilized as an equipment or remote controller for the payment for controlling the function of the drinking liquid automatic vending machine 39, it is neglected to operate a button or like of the automatic vending machine 39 and insert coins or like through a money insertion slit, thus being very convenient particularly for a handicapped person.

Figure 11:
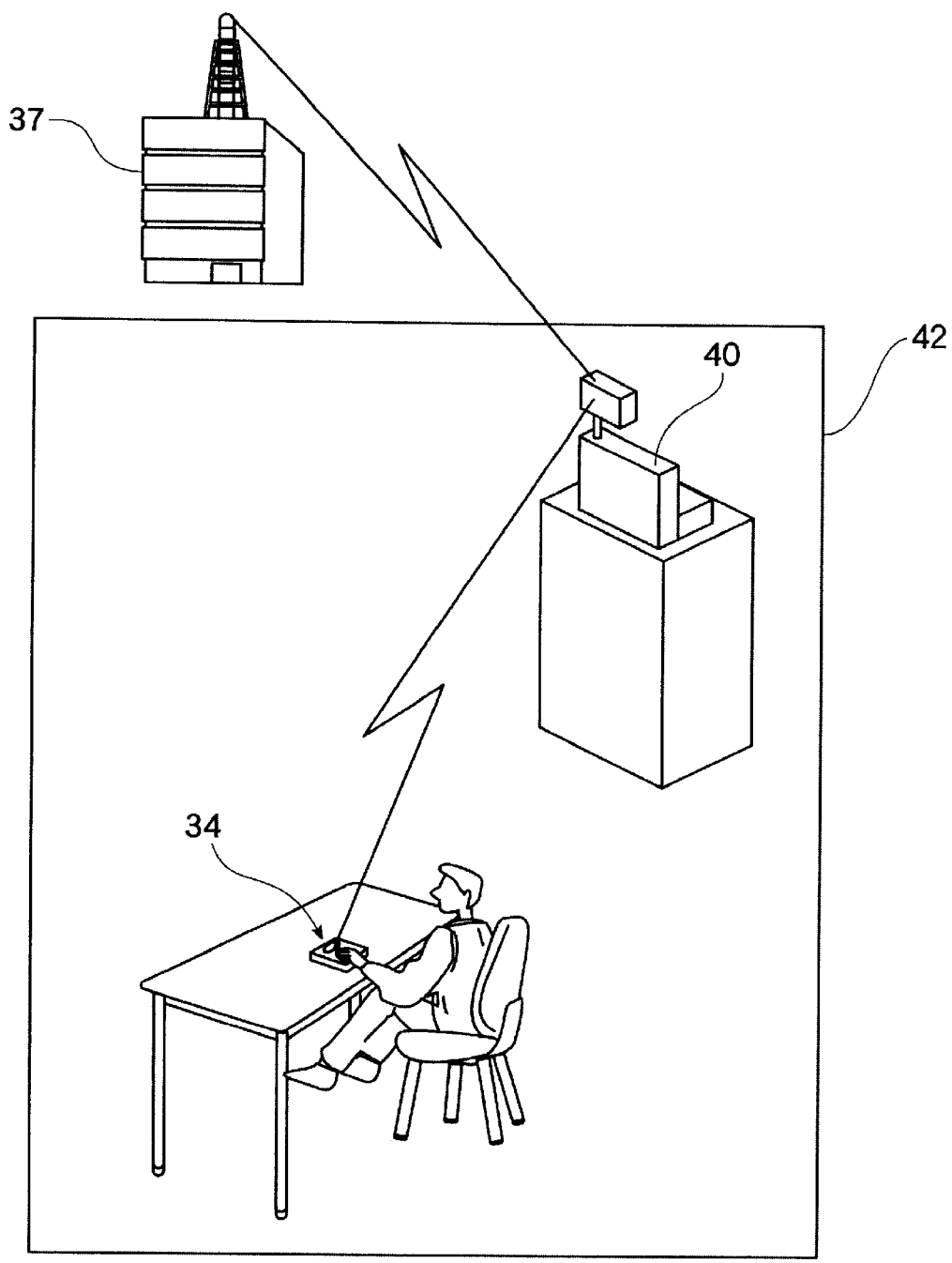
FIG. 11 illustrates a use of a shopping-center-type portable information terminal, provided with the push-button switch member of the first embodiment, according to a still further example of the second embodiment of the present invention.
Figure 12:
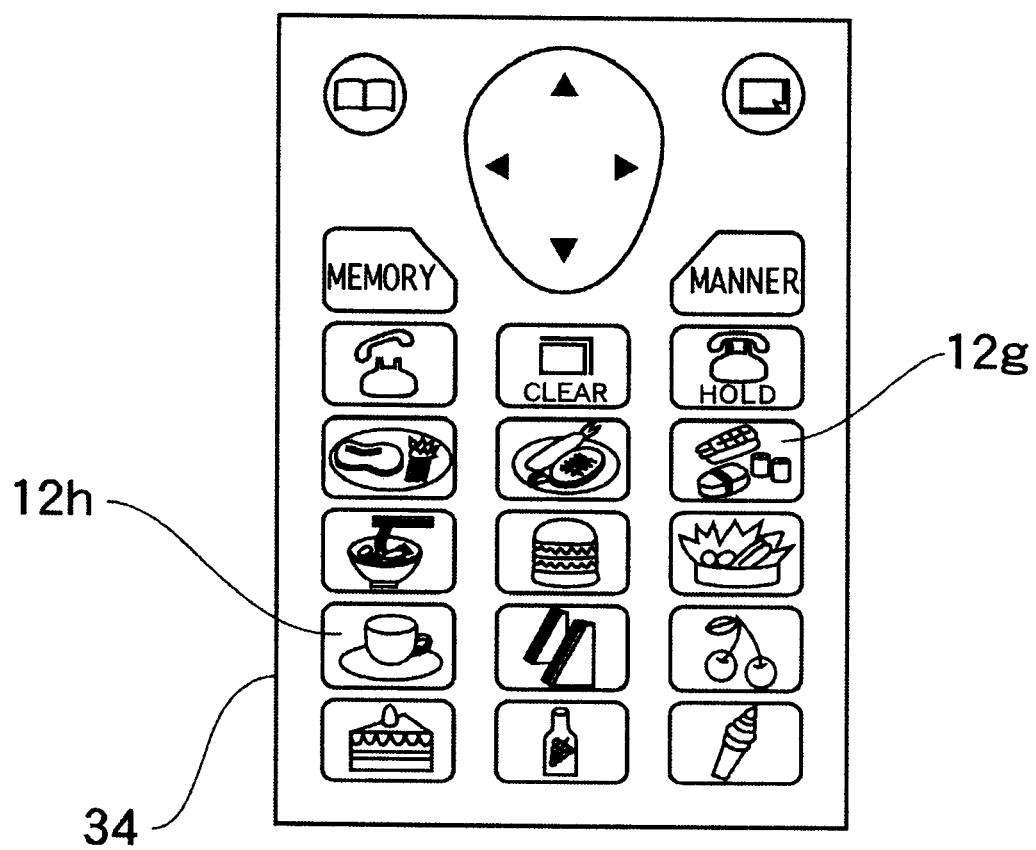
FIG. 12 illustrates an exemplary function display design of key-top portions of the portable information terminal shown in FIG. 11.

FIG. 11 illustrates a use of the portable information terminal 34 at a store shop use according to the third example of the embodiment of the present invention and FIG. 12 illustrates a function display design of a key top portion of the portable information terminal provided with the push-button switch member at the store shop use.

The design of FIG. 12 shows an example of an electrical or electronic equipment being an award/payment processing terminal 40, but the award/payment processing terminal is not limited to such example and may includes an award/payment system processing terminal provided at a store front or in a store such as convenience store, gasoline station or like.

The portable information terminal 34 provided with the push-button switch member shown in FIG. 12 has a liquid crystal display element 2 as an electrical or electronic equipment, which is designed such that texts or images based on the function display information obtained from the information stored in the award/payment processing terminal 40 at an eating (drinking) house or shop 42 can be displayed. According to such design, menu of drinks or foods sold by the eating house 42 will be displayed on the key top portions 12 of the portable information terminal 34 provided with the push-button switch member. In this case, the portable information terminal 34 is usable as a remote controller for the ordering and paying at the restaurant 42.

When such portable information terminal 34 is used, it is first operated to establish a communicatable state between it and the order receiving processing terminal 40 provided at the eating house 42 and, then, a user operates a desired key top portion 12 to obtain a function display information stored in the order receiving processing terminal 40.

Then, the electronic display equipment 2 of the portable information terminal 34 is operated in response to the obtained function display information. As shown in FIG. 12, the electronic display equipment 2 displays 12g of foods or displays 12h of drinks sold by this shop 42 are displayed on the key top portions 12, respectively, of the portable information terminal 34. Accordingly, when a user operates and pushes the key top portion 12 on which a desired object is displayed, such desired object can be ordered.

According to this example of the use of the portable information terminal 34, desired foods or drinks can be ordered without ordering to a waitress or waiter and a frequency of occurrence of misorder at the eating shop 42 can be reduced, thus being effective and available for economical management.

A case for the payment in transactions by using the portable information terminal 34 provided with the push-button switch member according to the embodiment described above will be described hereunder.

Figure 13:
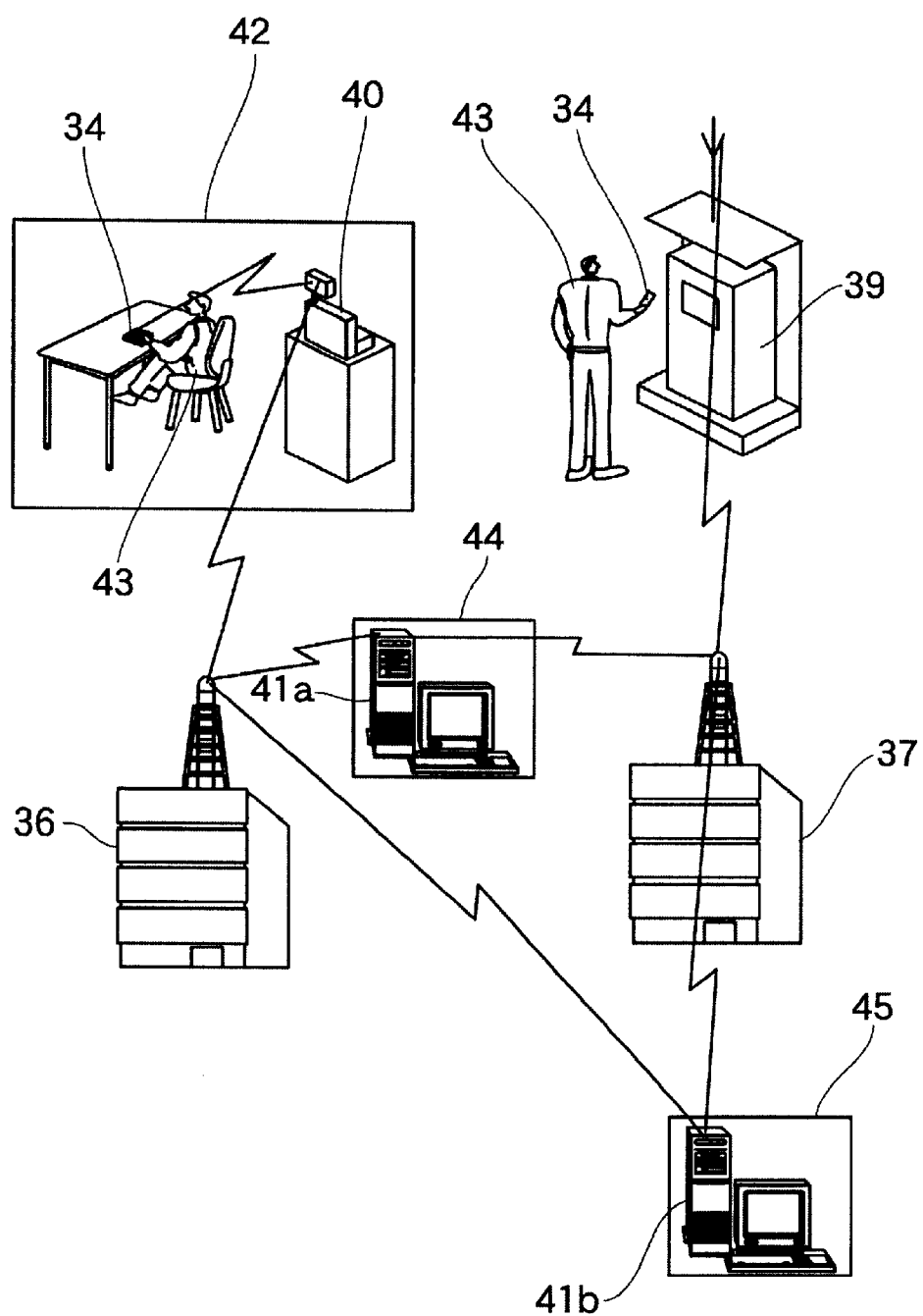
FIG. 13 illustrates a system arrangement for transaction in a case of using the portable information terminal, provided with the push-button switch member of the first embodiment, according to a still further example of the second embodiment of the present invention.

FIG. 13 is a schematic system diagram in a case of transaction by using the portable information terminal provided with the push-button switch member according to the third example mentioned above, and FIG. 14 is a flowchart showing a method or processes of payment in the case of FIG. 13.

Figure 14:
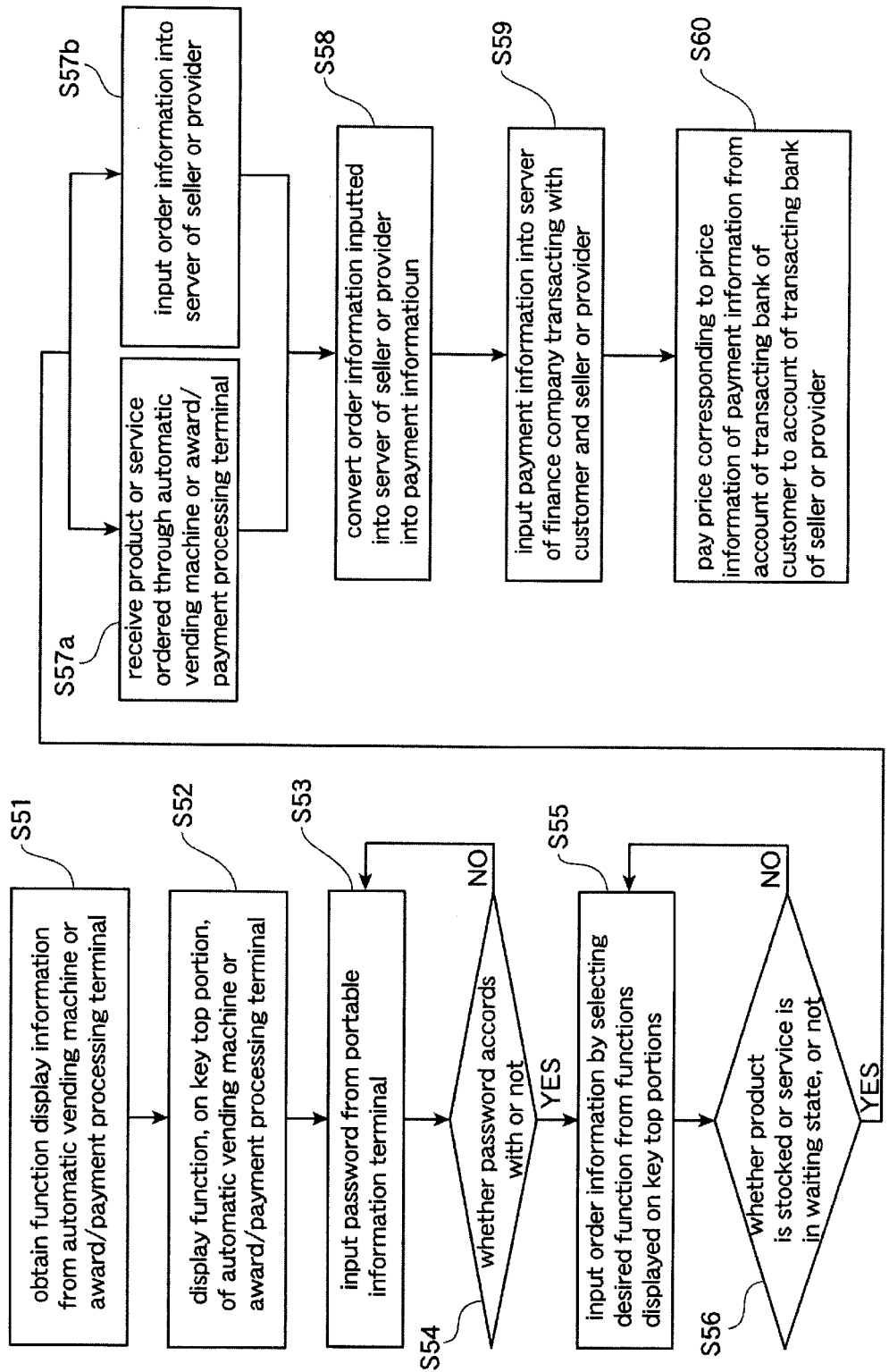
FIG. 14 is a flowchart of payment in the case of carrying the transaction by using the example shown in FIG. 13.
Figure 15:
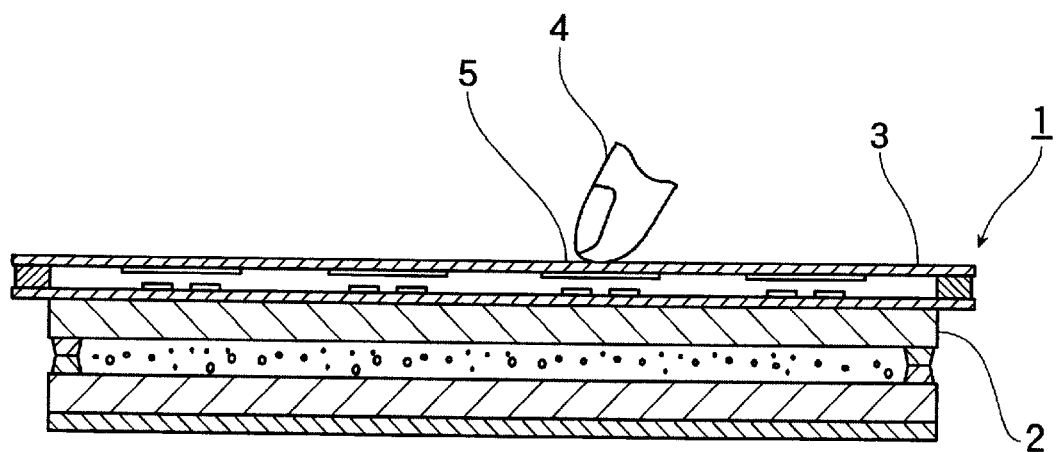
FIG. 15 is a sectional view of a conventional liquid crystal panel.

With reference to FIGS. 13 and 14, in an actual operation for use, first, a customer or demander 43, being an owner of the portable information terminal 34, approaches to a portion near the automatic vending machine 39 or award (reception)/payment processing terminal 40 at which the communication between the portable information terminal 34 and the automatic vending machine 39 or award/payment processing terminal 40 can be established.

Step S51

The customer or user operates at least one of key top portions 12 (push-button switch member) of the portable information terminal 34 provided with the push-button switch member to thereby obtain the information (function display informations), concerning the products or services to be sold or provided, stored in the automatic vending machine 39 or award/payment processing terminal 40.

Step S52

Then, the text or image based on the information (function display information) concerning the products or services to be sold or provided as stored in the automatic vending machine 39 or the award/payment processing terminal 40 is displayed on the key top portion 12 of the portable information terminal 34 provided with the push-button switch member.

Step S53

In the next step, the customer 43 inputs his (her) password through the portable information terminal 34.

Step S54

In this step, the thus inputted password is discriminated through comparison with a password stored in the server 41a of the provider 44 or server 41b of a finance company 45 as to whether the inputted password is a properly qualified person for obtaining a product or receiving a service.

In the comparison, when the inputted password is discriminated to be a properly qualified person, a communicable state is provided. However, when the password is discriminated not to be the properly qualified person, it is instructed to be again inputted. Further, although it is not particularly described in the flowchart of FIG. 4, in a case where the inputting operation is repeated and judged not to be proper (the password is not for the properly qualified person) in this step S54, the number of the re-inputting operations may be limited to a proper number so as to stop the communication itself.

Step S55

On the other hand, in the step S54, when the password is discriminated to be properly qualified person, that is, it is discriminated that the product is to be sold or service is to be provided, the customer 43 selects the product or service which the customer 43 wants to obtain from the key top portions 12 on which the products or contents of the services are displayed, and then, the customer 43 orders the desired product or service (inputs the information thereof).

Step S56 and Step S57

Then, the order information is verified to stock condition of the ordered product or waiting condition of the ordered service stored in the automatic vending machine 39 or the award/payment processing terminal 40 (S56), and in a case of discriminating that the ordered product is stocked or ordered service is waiting, the order is accepted and the product is sold or the service is provided (S57a), and then, the order information is inputted into the server 41a of the provider 44 of the product or service through the nearest base station 36 or 37 (S57b).

In the described step, in a case of no stock of the product or no waiting state of the service, the re-inputting for the re-ordering is demanded. Further, although not shown in FIG. 14, in a case where, even in the re-ordering, there is no stock of the product or no waiting state of the service, the number of the re-inputting operations may be limited to a proper number so as to stop the communication itself, i.e., stop the selling of the product or providing the service itself.

In the flowchart of the steps of FIG. 14, in the step S56, although the stock of the product or the waiting state of the service is referred to as judgement standard for providing the information, other conditions for selling the product or providing the service may be additionally set as occasion demands. For example, there may be added informations whether the customer is a person who is prohibited by the law to buy a product such as tobacco, liquor, adult magazine or like or whether the customer is a person having a physically or mentally handicapped person such as aged person, intellectually handicapped person, adult diseased person or like.

Further, with reference to FIG. 13, although tile server 41a of the seller or provider 44 is shown at a different position from the restaurant 42, these portions may be positioned at the same position (in the store) or different positions.

Step S58 and Step S59

In the server 41a of the seller or provider 44 receiving the order information of the customer 43, the order is converted to a payment information such as seller or provider information, product or service information, selling amount (number) information, price information or individual personal information of the seller or provider, or like information (S58), and such payment information is transmitted to and inputted into the server 41b of the finance company 45 transacting to the customer 43 and the seller or provider 44 (S59).

Step S60

Then, finally, in accordance with the seller or provider information, the price information and the individual personal information of the customer 43 in such payment informations, money corresponding to the price information is automatically transferred from an account of a bank of the customer 43 based on the individual personal information of the customer 43 to an account of the seller or provider 44 based on the seller or provider information.

According to this step, the money corresponding to the price information is automatically paid from the account of the customer's bank.

In FIG. 13, although the financial companies of the seller or provider 44 and the customer 43 are shown as the same company 45, the above transacting may be performed between the different finance companies.

The finance company 45 may be a credit card company, other the bank, having a transacting with the customer 43 and the seller or provider 44.

In such case, when the input information from the portable information terminal 34 provided with the push-button switch member of the customer 43 is transmitted to the seller or provider 44 and a server such as credit card company, the credit company pays in advance to the seller or provider 44 on the basis of the input information and draw out the price from the account of the customer 43.

As mentioned above, when the portable information terminal 34 provided with the push-button switch member of the third example of the present invention is used for the payment system, it is possible to obtain a product stored in the automatic vending machine 39 even if a user has no money.

Furthermore, even in a case where a user has no cash or payment card such as, prepaid card, credit card or like, a desired product or service can be obtained at the store, such as eating house, convenience store, gasoline station or like, which is provided with the award/payment processing terminal 40.

Therefore, if the user or customer has such portable information terminal 34 provided with the push-button switch member can buy various products or obtain various service at stores without carrying about a plurality of payment cards.

In these days, it has been developed a payment system through electronic commercial transacting utilizing the internet. However, it is difficult or not easy, for persons who are not familiar with the operations of personal computers, specific information terminals and the like equipment, to search home pages of sellers or providers and operates many key top portions on key boards thereof so as to obtain necessary informations or carry out transactions, and hence, such persons are not ready for use of such equipment.

On the other hand, in the case where the payment system using the portable information terminal 34 provided with the push-button switch member according to the third example of the embodiment of the present invention is utilized, this system would be widely utilized because of its easiness for handling and operability.

Still furthermore, in the case where the payment system using the portable information terminal 34 provided with the push-button switch member according to this third example is utilized, the sellers or providers 44 can save their labours for recovering money and surely recover the money without failure, thus being convenient for the efficiency and soundness of operation or running.

Still furthermore, for the seller or provider 44, it is possible to obtain the informations concerning the selling or providing of products (product stock condition) or services (service waiting condition) at the initial time of selling or providing, so that the POS (point of sale) system can be further improved with high efficiency through the interoperation with the POS system.

Further, it is to be noted that the present invention is not limited to the described examples or embodiments and many other changes, modifications and additions may be made without departing from the scopes of the appended claims.

What is claimed is:

1. A portable information terminal comprising:
   an electronic display operable to produce a function display;
   a touch panel having a push-button switch comprising a movable key top portion, through which the function display produced by said electronic display is displayed, a stationary contact, and a movable contact disposed under said key top portion opposed to said stationary contact, said movable contact being capable of being depressed by said key top portion toward said stationary contact; and
   a communication means operatively connected to said push-button switch for communicating via endless interactive communication with other equipment having a communication function,
   wherein said key top portion, said movable contact and said stationary contact are positioned in an overlapped positional relationship,
   wherein one of said movable contact and said stationary contact is capable of being electrically connected to a circuit that is operable to perform a function corresponding to the function display such that, when said movable contact is depressed such that said movable contact and said stationary contact become in contact with each other, the circuit performs the function corresponding to the function display,
   wherein said portable information terminal is operable to receive function display information from the other equipment via the interactive communication when said portable information terminal is within a communication proximity to the other equipment, and
   wherein said electronic display is operable to produce the function display based on the received function display information.

2. A portable information terminal according to claim 1, wherein said portable information terminal is a portable communication machine.

3. A portable information terminal according to claim 1, wherein said other equipment comprises a piece of electrical or electronic equipment.

4. A portable information terminal according to claim 1, wherein said electronic display is operable to produce the function display as text or an image in accordance with function display information obtained from information stored in a server of a seller or provider which is in communication with a base station.

5. A portable information terminal comprising:
   an electronic display operable to produce a function display;
   a touch panel having a push-button switch comprising a movable key top portion, through which the function display produced by said electronic display is displayed, a stationary contact, and a movable contact disposed under said key top portion opposed to said stationary contact, said movable contact being capable of being depressed by said key top portion toward said stationary contact; and
   a communication means operatively connected to said push-button switch for communicating via endless interactive communication with other equipment having a communication function,
   wherein said key top portion, said movable contact and said stationary contact are positioned in an overlapped positional relationship,
   wherein one of said movable contact and said stationary contact is capable of being electrically connected to a circuit that is operable to perform a function corresponding to the function display such that, when said movable contact is depressed such that said movable contact and said stationary contact become in contact with each other, the circuit performs the function corresponding to the function display,
   wherein said portable information terminal is operable to receive function display information from the other equipment via the interactive communication when said portable information terminal is within a communication proximity to the other equipment,
   wherein said electronic display is operable to produce the function display based on the received function display information, and
   wherein said portable information terminal is capable of instructing the other equipment to perform a function corresponding to the function display displayed on said push-button switch when said push-button switch is pushed.

6. A portable information terminal according to claim 5, wherein the other equipment comprises a piece of electrical or electronic equipment.

7. A portable information terminal according to claim 6, wherein the piece of electrical or electronic equipment comprises home automation equipment that is operable to communicate with the portable information terminal via the endless interactive communication.

8. A portable information terminal according to claim 6, wherein the piece of electrical or electronic equipment comprises an automatic vending machine that is operable to communicate with the portable information terminal via the endless interactive communication, and
   wherein the automatic vending machine comprises one of a tobacco automatic vending machine, a drink automatic vending machine and a ticket automatic vending machine.

9. A portable information terminal according to claim 8, further comprising a memory capable of storing personal information including information of birth date, identification number and address of a user and a transmission means for transmitting the personal information from said memory to the automatic vending machine.

10. A portable information terminal according to claim 8, further comprising a printing portion operable to print a bar-code print-out or concealed data print-out,
    wherein the bar-code print-out or concealed data print-out comprises personal information including information of birth date, identification number and address of a user,
    wherein the bar-code print-out or concealed data print-out only is readable by ultraviolet light, and
    wherein the automatic vending machine comprises a reader operable to read the bar-code print-out or concealed data print-out.

11. A portable information terminal according to claim 6, wherein the piece of electrical or electronic equipment comprises an award/payment processing terminal provided at or in a store, and
    wherein the award/payment processing terminal is operable to communicate with the portable information terminal via the endless interactive communication.

12. A portable information terminal according to claim 6, wherein the piece of electrical or electronic equipment comprises a domestic electrical or electronic piece of equipment that is operable to communicate with the portable information terminal via the endless interactive communication.

13. A portable information terminal according to claim 5, wherein said electronic display is operable to produce the function display as text or an image in accordance with function display information obtained from information stored in a server of a seller or provider which is connected to a base station.

14. A portable information terminal according to claim 5, wherein said electronic display is operable to produce the function display to be substantially the same as a function display displayed on the other equipment.

15. A price payment system comprising:

an electronic display operable to produce a function display;

a touch panel having a push-button switch comprising a movable key top portion, through which the function display produced by said electronic display is displayed, a stationary contact, and a movable contact disposed under said key top portion opposed to said stationary contact, said movable contact being capable of being depressed by said key top portion toward said stationary contact;

a communication means operatively connected to said push-button switch for communicating via endless interactive communication with other equipment having a communication function;

a first server operable to receive order information via an award/payment processing terminal provided for an automatic vending machine or a seller or provider in response to an operation of said push-button switch, said first server being operable to convert the order information into payment information of a customer; and a second server operable to receive the payment information, wherein said key top portion, said movable contact and said stationary contact are positioned in an overlapped positional relationship, wherein one of said movable contact and said stationary contact is capable of being electrically connected to a circuit that is operable to perform a function corresponding to the function display such that, when said movable contact is depressed such that said movable contact and said stationary contact become in contact with each other, the circuit performs the function corresponding to the function display, wherein said communication means is operable to receive function display information from the other equipment via the interactive communication when said communication means is within a communication proximity to the other equipment, wherein said electronic display is operable to produce the function display based on the received function display information, wherein said price payment system is in communication with a bank of the seller or provider and a bank of the customer, and wherein said price payment system is capable of transferring an amount money corresponding to the payment information between an account the bank of the customer and an account of the bank of the seller or provider.

16. A price payment system according to claim 15, wherein said payment information includes seller/provider information, product/service information, selling number information, price information and personal specific information, and wherein said second server is operable to receive the seller/provider information, the price information and the personal specific information.

17. A price payment system comprising:

an electronic display operable to produce a function display;

a touch panel having a push-button switch comprising a movable key top portion, through which the function display produced by said electronic display is displayed, a stationary contact, and a movable contact disposed under said key top portion opposed to said stationary contact, said movable contact being capable of being depressed by said key top portion toward said stationary contact; and a communication means operatively connected to said push-button switch for communicating via endless interactive communication with other equipment having a communication function, wherein said key top portion, said movable contact and said stationary contact are positioned in an overlapped positional relationship, wherein one of said movable contact and said stationary contact is capable of being electrically connected to a circuit that is operable to perform a function corresponding to the function display such that, when said movable contact is depressed such that said movable contact and said stationary contact become in contact with each other, the circuit performs the function corresponding to the function display, wherein said communication means is operable to receive function display information from the other equipment via the interactive communication when said communication means is within a communication proximity to the other equipment, wherein said electronic display is operable to produce the function display based on the received function display information, wherein said communication means is capable of instructing the other equipment to perform a function corresponding to the function display displayed on said push-button switch when said push-button switch is pushed, wherein said price payment system is in communication with a bank of the seller or provider and a bank of the customer, and wherein said price payment system is capable of transferring an amount money corresponding to the payment information from an account of the bank of the customer to an account of the bank of the seller or provider.

18. A price payment system according to claim 17, wherein said payment information includes seller/provider information, product/service information, selling number information, price information and personal specific information, and wherein said second server is operable to receive the seller/provider information, the price information and the personal specific information.

19. A portable information terminal comprising:

a push-button switch member comprising a touch panel having a push-button switch provided thereon, an electronic display disposed in operative association with said push-button switch, and a key top portion disposed in operative association with said push-button switch, said electronic display operable to produce a function display through said key top portion; and a communication means operatively connected to the push-button switch member for communicating via endless interactive communication with other equipment having a communication function, wherein said portable information terminal is operable to receive function display information from the other equipment via the interactive communication when said portable information terminal is within a communication proximity to the other equipment, and wherein said electronic display is operable to produce the function display based on the received function display information in response to receipt of the received function display information.

* * * * *